(12) United States Patent
Burbridge et al.

(10) Patent No.: US 10,440,057 B2
(45) Date of Patent: Oct. 8, 2019

(54) METHODS, APPARATUS AND SYSTEMS FOR PROCESSING SERVICE REQUESTS

(71) Applicant: BRITISH TELECOMMUNICATIONS PUBLIC LIMITED COMPANY, London (GB)

(72) Inventors: Trevor Burbridge, London (GB); Alan Smith, London (GB); Andrea Soppera, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 4 days.

(21) Appl. No.: 15/118,608

(22) PCT Filed: Feb. 3, 2015

(86) PCT No.: PCT/GB2015/050281
§ 371 (c)(1),
(2) Date: Aug. 12, 2016

(87) PCT Pub. No.: WO2015/121617
PCT Pub. Date: Aug. 20, 2015

(65) Prior Publication Data
US 2017/0063929 A1    Mar. 2, 2017

(30) Foreign Application Priority Data
Feb. 14, 2014    (EP) .................................. 14250026

(51) Int. Cl.
*H04L 29/06*    (2006.01)
*H04L 29/12*    (2006.01)

(52) U.S. Cl.
CPC .......... *H04L 63/20* (2013.01); *H04L 61/1511* (2013.01); *H04L 61/2015* (2013.01);
(Continued)

(58) Field of Classification Search
CPC ..... H04L 63/20; H04L 63/2015; H04L 63/10; H04L 61/1511; H04L 61/2015; H04L 61/2514; H04L 63/0876
(Continued)

(56) References Cited

U.S. PATENT DOCUMENTS

2002/0031135 A1* 3/2002 Inoue ................ H04L 29/12216
370/401
2006/0235982 A1* 10/2006 Koshino ............. H04L 12/2805
709/227
(Continued)

FOREIGN PATENT DOCUMENTS

FR         2 986 127         7/2013

OTHER PUBLICATIONS

International Search Report for PCT/GB2015/050281, dated Apr. 9, 2015,(3 pages).
(Continued)

*Primary Examiner* — Matthew T Henning
(74) *Attorney, Agent, or Firm* — Nixon & Vanderhye P.C.

(57) ABSTRACT

Methods, apparatus and systems for processing digital content service requests from user devices in a user network are disclosed. The method, performed by a control device, comprises receiving policy indications in respect of the user devices indicating desired control policies to be implemented in respect of the user devices, and associating user device source identifiers with the user devices indicating a network location to which responses should be directed, the user device source identifier associated with a particular user device depending on the policy indication for that user device. On receiving digital content service requests containing indications of domain names associated with content providers from which digital content is desired, the control device submits server location requests to a domain name
(Continued)

system server comprising (i) the domain name from the digital content service request and (ii) the user device source identifier for the user device in question.

15 Claims, 6 Drawing Sheets

(52) U.S. Cl.
CPC .......... *H04L 63/0876* (2013.01); *H04L 63/10* (2013.01); *H04L 61/2514* (2013.01)

(58) Field of Classification Search
USPC ............................................................ 726/1
See application file for complete search history.

(56) References Cited

U.S. PATENT DOCUMENTS

| | | | | |
|---|---|---|---|---|
| 2007/0008976 | A1* | 1/2007 | Meenan | H04L 12/2856 370/392 |
| 2009/0100513 | A1* | 4/2009 | Coburn | H04L 63/0209 726/11 |
| 2009/0157889 | A1 | 6/2009 | Treuhaft | |
| 2011/0292938 | A1 | 12/2011 | Harp et al. | |
| 2013/0198065 | A1 | 8/2013 | McPherson et al. | |
| 2014/0373107 | A1 | 12/2014 | Mareschal et al. | |
| 2015/0229584 | A1* | 8/2015 | Okamoto | H04L 12/5692 709/226 |

OTHER PUBLICATIONS

Written Opinion of the ISA for PCT/GB2015/050281, dated Apr. 9, 2015, (6 pages).
Search Report for EP 14250026.3, dated Aug. 5, 2014, 8 pages.
Guomundsson et al., An IETF Tutorial entitled "DNS for Protocol Designers", (DNS Tutorial@IETD-70, Feb. 12, 2007, (54 pages) https://www.opendns.com/parental-controls.
Hoffman, "4 Ways to Set Up Parental Controls on Your Home Network" http://www.howtogeek.com/167545/4-ways-to-set-up-parental-controls-on-your-home-network/, published Jul. 15, 2013. (5 pages).
International Preliminary Report on Patentability PCT/GB2015/05028, dated Jun. 9, 2016, (9 pages).

* cited by examiner

Figure 1: Allocation of device IP address based upon device parental control settings in home gateway Figure 2: DNS-based parental control by splitting the IPv6 address range Figure 3: Blocking of self-allocated non-parental control address Figure 4: NAT mapping of IPv4 private to public address Figure 5: NAPT mapping of IPv4 private to single public address with parental-control and non-parental-control port ranges Figure 6: Parental control process

METHODS, APPARATUS AND SYSTEMS FOR PROCESSING SERVICE REQUESTS

This application is the U.S. national phase of International Application No. PCT/GB2015/050281 filed 3 Feb. 2015, which designated the U.S. and claims priority to EP Patent Application No. 14250026.3 filed 14 Feb. 2014, the entire contents of each of which are hereby incorporated by reference.

TECHNICAL FIELD

The present invention relates to methods, apparatus and systems for processing digital content service requests from devices in a user network such as a home, school or corporate network. Preferred embodiments relate to techniques often referred to as "parental control" in respect of user devices such as computers in user networks such as home networks which comprise the user devices and at least one control device such as a gateway device configured to control communication between the user devices in the user network and servers in external networks.

BACKGROUND TO THE INVENTION AND PRIOR ART

The phrase "parental control" generally relates to techniques allowing a parent or another such person having a decision-making role in relation to others, such as a network administrator, to control the manner in which various devices under their control may be used, and to features of devices allowing such control to be implemented. Parental control may relate to computers (particularly those that are "networked" and may thus obtain content via the Internet and/or other networks), televisions, electronic games, mobile phones and other such devices, and parental control features may be included or used in relation to network services, digital television services, computer and video games, mobile devices and software.

Parental control in respect of computing or other devices in home or other user networks that are able to access the Internet (or other such external networks) from a user network (via a consumer or business broadband line for example) may be achieved using various approaches. One approach is to implement secure controls in each device that accesses any external network. This typically involves installing anti-virus or firewall software onto the devices that incorporates parental-control features. Some devices (e.g. Set-Top Boxes, televisions etc.) may have parental-control features incorporated into their design. The problem with this approach is twofold: (1) technical knowledge/skill may be needed to install and configure the correct controls; (2) the controls can be circumvented by using a device that does not include such controls, or by using a device that includes such controls but in which they have been disabled or incorrectly configured. Some such devices do not permit a parent, account owner or other such administrator to prevent such controls from being disabled or reconfigured by others.

Another approach involves controls implemented on behalf of parents, account owners or other such user network administrators by external network providers or service providers. Such controls can take several forms, from simple Internet Protocol (IP) address blocks to in-line scanning of content being accessed. An increasingly popular method is to implement "DNS-based" controls. Normally, according to the Domain Name System (DNS), if a user wishes to obtain content via the Internet using an Internet-enabled computing device, the user's device submits a DNS request—including the domain or "canonical" name of a website from which the user wishes to obtain content—to a DNS server, which is usually controlled by the user's Internet Service Provider (ISP), but which may be controlled by another entity. The DNS server generally responds by providing the IP address of a content server to which a request for the desired content may be routed. The user device then submits a content request to that content server, generally setting out the desired content in the form of a uniform resource locator (URL).

With DNS-based parental controls, domain names deemed inappropriate (e.g. by an ISP on behalf of its customers) for any of a number of reasons (e.g. because content they provide has been deemed to fall under one or more categories of inappropriateness) are blacklisted. DNS queries in respect of those domain names from customers who have requested parental control (or from customers who have requested parental control in respect of content of a particular category under which a particular domain name has been categorised) do not result in the DNS server returning an IP address for the user to access the desired content. Instead, parental-control-capable DNS servers may refuse the DNS request, generally by responding in a manner that does not assist the user in obtaining the inappropriate content and/or explains the parental control issue concerned and what the user can do about it, or by not responding at all.

While not responding to DNS queries at all or responding with "domain name not found" or similar messages are valid options for a DNS server, DNS servers usually respond with the IP address of a server which, rather than being that of a content server capable of providing the desired (but inappropriate) content, is that of a server which will instead respond to content requests in respect of the desired (but inappropriate) content with content from a webpage explaining what has happened and why the desired content is not available.

It will be understood that technically-aware users can circumvent such DNS-based controls by changing the DNS server that their device or application uses, so other controls may be needed to stop DNS requests being made to other (non-parental-control-enabled) DNS servers.

While DNS-based parental controls can be effective, they suffer from problems such as the above and such as the following. Firstly, even if controls are in place to prevent DNS requests from being made to other DNS servers, the system may still not be completely secure. Users can access content by directly using IP addresses for their content requests—typing these into their device's browser, for example—instead of using domain names requiring DNS resolution. While this option poses a significant hurdle, since IP addresses generally need to be identified via non-parental-control lines, it is an option available particularly to technically-aware users, available via other routes, such as e-mails, online discussion fora, etc. Another option that can circumvent DNS-based parental controls involves using a Virtual Private Network (VPN) or network tunnel to bypass the provider offering the parental-control service. By securely routing traffic beyond the provider's network, a user may be free to access uncontrolled DNS servers. Such circumvention can be made more difficult by blocking the use of secure encrypted tunnels for parental-control lines, for example, but application layer tunnels (e.g. using HTTPS or SSL) are impossible to block without causing a detrimental impact on user services.

A second problem of current approaches, which can also be regarded (in some ways) as one of their strengths, is that all devices in a particular user network are blocked (or "parental-controlled") to the same extent. Current DNS-based approaches do not permit just some devices in a particular user network to be subject to control but not others, or permit some devices to be subject to different levels or categories of control to others. This is because DNS servers do not receive any client device identity (other than a normally dynamic IP address) or individual device information. DNS requests from each user device in a particular customer's user network will be treated in the same manner.

A third problem relates to the scalability of any supplementary security controls, i.e. blocking uncontrolled DNS server access and VPN tunnels. Such controls must be applied on a line-by-line basis on equipment that knows to which broadband lines parental control should be applied.
Prior Art Disclosures An IETF Tutorial entitled "DNS for Protocol Designers" by Ólafur Guðmundsson and Peter Koch (DNS Tutorial @IETF-70, dated Dec. 2, 2007, which is available online at: http://www.ietf.org/proceedings/70/slides/dnstut-0.pdf gives an overview of the DNS system.

"OpenDNS", about which information can be found online at http://www.opendns.com/ is an example of a DNS service that offers parental controls. Specific details can be found on pages entitled "Parental Controls", available online at http://www.opendns.com/parental-controls. OpenDNS suffers however from problems such as those described above: A parent or other person responsible for a household network must either subscribe each device in the household into parental control or else configure each and every device separately. OpenDNS Parental Controls work by forcing devices or Home Gateways to use DNS servers that perform parental-control filtering. OpenDNS also requires account settings to be updated to inform OpenDNS of the public IP address used by the broadband line in question so that OpenDNS can confirm that the user has an active parental-control account. This can be done automatically by installing a client program onto a device within the home network that reports to OpenDNS.

An online article by Chris Hoffman entitled "4 Ways to Set Up Parental Controls On Your Home Network", published on the website http://www.howtogeek.com/ and available online at http://www.howtogeek.com/167545/4-ways-to-set-up-parental-controls-on-your-home-network/ (dated Jul. 15, 2013) discusses various techniques for implementing parental control using settings on individual user machines and using routers and DNS-based systems.

United States patent application US 2011/292938 discloses a system and method for parental control in which a block of IP addresses is divided into a parental-control address block and a non-parental-control address block. Access devices of users that wish to use parental control are given an IP address from the block of addresses assigned to parental control, which is then applied in respect of any transactions from that user's network. It is proposed that multiple policy managers may be co-located with access routers between the users' access devices and a transport router linked to the Internet. The solution proposed is that the access device is allocated a parental-control IP address, but the client to be controlled may mark individual transactions which are then inspected by a policy manager to determine if they should be subject to parental control or not.

United States patent application US2009/0157889 relates to communications networks, and in particular to techniques for controlling DNS behaviour on a per-request basis. By virtue of such techniques, users of a DNS service that provides DNS resolution options or features (e.g. mis-spelling re-direction, parental filters, domain blocking, phishing protection, etc.) through the DNS process, can influence how requests for DNS information are handled on a per-request basis.

French patent application FR2986127 relates to techniques for controlling communication. According to such techniques, an appliance is provided with a program suitable for issuing a DNS request and a control program enabling the DNS request to be intercepted. The control program includes communications elements for communicating with a DNS server to which the DNS request is transmitted, and for communicating with another server for authorisation. An authorisation request, distinct from the DNS request, including an identifier of the user of the appliance and the domain name, is transmitted to the DNS server. The authorisation server returns to the DNS server a response established as a function of the identifier of the user of the appliance and as a function of the domain name contained in the authorisation request. The communications elements for communicating with the issuing program transmit to the issuing program an IP address defined as a function of the response from the authorisation server.

SUMMARY OF THE INVENTION

According to a first aspect of the present invention, there is provided a method of processing digital content service requests from one or more user devices in a user network, the user network comprising one or more user devices and at least one control device configured to control communication between the one or more user devices in the user network and one or more servers in one or more external networks, each digital content service request relating to digital content desired by a user of a user device, the method comprising:

the at least one control device receiving a policy indication in respect of each of one or more user devices in the user network, the respective policy indications indicating a desired control policy to be implemented in respect of digital content service requests from the respective user devices;

the at least one control device associating respective user device source identifiers with respective user devices in the user network in respect of which policy indications have been received, each user device source identifier indicating to a server in an external network a network location to which a response to a request should be directed, the user device source identifier associated with a particular user device being dependent on the policy indication received in respect of that user device; and the at least one control device receiving a digital content service request from a user device in the user network, the digital content service request containing an indication of a domain name associated with a content provider from which digital content is desired by the user of the user device, and submitting a server location request in respect thereof to a domain name system server configured to respond to respective server location requests in a manner dependent on a user device source identifier included with the server location request, the server location request comprising:

an indication of the domain name indicated in the digital content service request; and  the user device source identifier associated with the user device from which the digital content service request has been received.

According to preferred embodiments, the at least one control device may associate a different user device source identifier with each of a plurality of the user devices. This may be applicable in scenarios where the control device is IPv6-enabled, and where sufficient IP addresses are available for each user device to have its own externally-accessible IP address, for example. It may be used to allow a different control policy to be implemented in respect of each user device. The at least one control device may however associate the same user device source identifier with a plurality of user devices in respect of which policy indications have been received indicating the same desired control policy. This may be applicable in scenarios where the number of IP addresses available for use by the control device is limited (e.g. where the control device is not IPv6-enabled, and is limited to just two, or just a few IPv4 addresses, or to just one IPv4 address with a limited number of port numbers, for example), or in scenarios where it is desired to group user devices for control or other purposes, for example.

According to preferred embodiments, the respective user device source identifiers associated with user devices may be different routing identifiers such as IP addresses, which may then each be externally-addressable by devices in external networks. Alternatively, the respective user device source identifiers associated with user devices may be device identifiers that are meaningful within the user network but not outside it—in such cases it may be necessary for the control device to convert these into one or more externally-meaningful routing identifiers for use by devices in external networks, and to handle the forwarding of responses from devices in external networks to the correct user device in the user network accordingly.

According to preferred embodiments, the respective user device source identifiers associated with user devices may be different port numbers, which may be different port numbers of the same address, which may be the IP address of the control device or other such gateway device. It will be understood however that IP routing tables do not generally include port numbers even though the port number may be used in the course of Network Address Translation to determine where to route data.

According to some embodiments, the at least one control device provides user device source identifiers to respective user devices for inclusion by said user devices in digital content service requests. This may be applicable in particular in scenarios where IPv6 addresses are being used, and where there are sufficient IPv6 addresses available that each user device may have its own.

According to other embodiments, the at least one control device need not provide user device source identifiers to respective user devices for inclusion by said user devices in digital content service requests. Instead, when submitting a server location request in respect of a digital content service request received from a particular user device, the at least one control device may include the user device source identifier associated with that user device with the server location request. This may replace any user device source identifier provided by the user device for internal addressing reasons or otherwise, for example.

The control policy to be implemented in respect of digital content service requests from a particular user device may relate to whether or not it is desired by an administrator of the user network for respective server location requests from that user device to be served or not served in dependence on the domain name indicated in a digital content service request in respect of which a server location request has been submitted and/or in dependence on the digital content in respect of which a server location request has been submitted. Such use of control policies may be used in scenarios where it is simply desired to be able to specify whether a particular user device should be subject to "parental control" or not, for example.

The control policy to be implemented in respect of digital content service requests from a particular user device may relate to one or more categories of domain name and/or categories of digital content in respect of which it is desired by an administrator of the user network for respective server location requests from that user device to be served or not served by a domain name system server in dependence on the user device source identifier included in the server location request submitted to the domain name system server. Such use of control policies may be used in scenarios where it is desired to take advantage of DNS-based parental-control services in which web-sites or content may be classified under a number of individual categories which an administrator may wish to prevent different users from accessing, such as gambling, violence, "adult-content", online discussion, social networking, file-sharing or others, allowing an administrator to specify whether a particular user device should be subject to "parental control" in respect of content requests under any particular category or categories, for example.

According to preferred embodiments, the step of submitting a server location request may comprise submitting a server location request to a domain name system server in an external network, controlled for example by the Internet Service Provider for the user network in question.

The step of submitting a server location request comprises submitting the server location request to a domain name system server configured to respond to respective server location requests in a manner dependent on the user device source identifier included with the server location requests. Service from such domain name system servers is often offered by Internet Service Providers offering DNS-based parental-control services.

According to preferred embodiments, the method may further comprise the control device receiving a response from a domain name system server to a server location request submitted thereto, the response comprising a routing identifier in respect of a content device in an external network, the control device then forwarding the content device routing identifier to the user device from which the digital content service request was received. The content device routing identifier may then be used by the user device in order to submit a content request to a content device such as a server operated by a Content Delivery Network (CDN), in order to obtain the desired content.

According to a second aspect of the present invention, there is provided a control device for processing digital content service requests from one or more user devices in a user network, the user network comprising the control device and one or more user devices, the control device being configured to control communication between the one or more user devices in the user network and one or more servers in one or more external networks, each digital content service request relating to digital content desired by a user of a user device, the control device comprising:

an administrator interface configured to receive policy indications in respect of each of one or more user devices in the user network, the respective policy indications indicating a desired control policy to be implemented in respect of digital content service requests from the respective user devices;

a processor configured to associate respective user device source identifiers with respective user devices in the user network in respect of which policy indications have been received, each user device source identifier indicating to a server in an external network a network location to which a response to a request should be directed, the user device source identifier associated with a particular user device being dependent on the policy indication received in respect of that user device;

a user device interface configured to receive digital content service requests from user devices in the user network, a digital content service request containing an indication of a domain name associated with a content provider from which digital content is desired by a user of a user device; and an external network interface configured to submit server location requests in respect of received digital content service requests to a domain name system server in an external network, the domain name system server being configured to respond to respective server location requests in a manner dependent on a user device source identifier included with the server location request, each server location request comprising:

an indication of the domain name indicated in the received digital content service request; and     the user device source identifier associated with the user device from which the digital content service request has been received.

According to a third aspect of the present invention, there is provided a system for processing digital content service requests from one or more user devices in a user network, the user network comprising a control device according to the second aspect, one or more user devices, and a domain name system server configured to respond to respective server location requests in a manner dependent on the user device source identifier included with the server location requests.

The various options and preferred embodiments referred to above in relation to the first aspect are also applicable in relation to the second and third aspects.

Preferred embodiments of the invention may be used to provide improved parental control in relation to Internet services. A parent, account owner or administrator of a user network (of a household, of another premises, or of an entity such as a school or company, for example) may specify which individual user devices or groups of user devices within the user network should be restricted in the content they can access without any additional software needing to be installed on the individual user devices for the restrictions to be enforced. Preferred embodiments work in conjunction with DNS services, a server or operator of which maintains a list of which content parental-controlled user devices should be permitted to access. The DNS server does not need knowledge in advance of any DNS requests as to which devices if any within a user network or under which account should be controlled.

While DNS is currently used to implement parental control, known DNS-based parental-control systems do not discriminate between different user devices within a user network. Furthermore, they are generally complex and costly to implement since DNS servers (and other network systems which block access to unauthorised DNS servers) generally need to be "subscriber-aware" to determine whether controls should be applied. Preferred embodiments using the present approach enable a more flexible and scalable method of implementing DNS-based parental controls. Controls can be applied to individual user devices within the user network without any DNS server(s) involved or network security controls needing to be "subscriber-aware". DNS-based parental control can be provided at lower cost while being more scalable, while the network controls can be implemented on simple network equipment such as routers.

According to preferred embodiments in which IP addresses are used as the respective user device source identifiers, IP addresses to be used by user devices within a user network are divided such that devices to be subject to parental control are allocated one address, or an address from one set of IP addresses, while devices that are not to be subject to parental control are allocated a different address, or an address from a different set of IP addresses. Within the user network, simple IP address-based controls can be applied permanently to uncontrolled DNS and VPN traffic permanently. These controls may never need to change regardless of which lines and devices are subject to parental controls.

The assignment of IP addresses or other such source identifiers may be performed by a Home Gateway device based upon a device policy configured by the administrator of parental control service on that Home Gateway (e.g. the broadband account holder or other user who first enables the parental control service).

BRIEF DESCRIPTION OF THE DRAWINGS

Preferred embodiments of the present invention will now be described with reference to the appended drawings, in which.

DESCRIPTION OF PREFERRED
EMBODIMENTS OF THE INVENTION

With reference to the accompanying figures, methods and apparatus for processing digital content service requests according to a preferred embodiment will now be described.

The preferred embodiments described below relate to situations in which various user devices (such as desktop computers, laptop computers, "tablet" devices, handheld devices such as "smart" mobile phones or "Personal Digital Assistant (PDA)" devices, or other types of Internet-enabled devices such as Internet-enabled televisions or games-consoles) in a "home" user network communicate with the external network via a "home hub" or "home gateway" device, and that a parent (or other such "household administrator") wishes to be able to implement "parental controls" in respect of one or more of the user devices in the user network with a view to limiting or controlling the content that those user devices request from servers in the external network (or the ease with which users of those user devices may request and/or obtain certain content from certain servers in the external network) and/or limiting or controlling the content servers in the external network from which those user devices make content requests or otherwise communicate. It will be understood however that embodiments of the invention will be applicable in respect of scenarios other than "home" scenarios. The user network to be controlled may instead be a network such as, for example, a school network, a corporate network, a network of an Internet cafe, or another network where an administrator may wish to be able to exercise some level of control over the content that individual users may access using networked computing devices such as those referred to earlier, for example, or using other types of device. In such other scenarios (and even in "home" scenarios), the specific additional functionality attributed in the preferred embodiments to the "home hub" or "home gateway" device generally present in a home network may instead be performed by another type of control device, or by a plurality of such control devices.

The user network in question may be a wired network, a wireless network, or a combination of the two. It may be a local network within one or more buildings or other premises, a VPN serving devices in one or more geographical areas, or any of a variety of other such networks.

The "administrator" of the network may be a parent or other such customer of an ISP (e.g. in the context of a home network), so the term "parental control" will be used particularly in relation to the "household" scenario described, but it will be apparent that the role of "administrator" need not be performed by a "parent" even in a household scenario, and may be performed by different types of people in relation to different scenarios.

The terms "user" and "users" will generally be used in relation to a person or people using networked computing devices in the user network under the control of the administrator. The administrator may also be a user, of course, and may also be the "customer" of the ISP in respect of the user network in question.

Two types of implementation will be described, since the precise implementation may vary depending on whether the "home hub" or "home gateway" device (or other such control device) in question is IPv4-enabled or IPv6-enabled (where these terms refer to the version or versions of the Internet Protocol of which the device in question is capable). An IPv6 implementation will be described first, followed by an IPv4 implementation, both in the context of a "household" scenario, although it will be appreciated that both may also be applicable in relation to other scenarios. It will also be appreciated that in many instances, IPv6 and IPv4 implementations may exist in parallel to provide parental (or other) control to dual-stack devices that simultaneously use both version of the Internet Protocol.

In both IPv6 and IPv4 implementations the parent (or other administrator) of the "parental control" may perform a role of deciding which of the user devices are to be controlled and/or the extent to which different user devices are to be controlled, and configuring the home gateway device (or other such device) accordingly. This can be done by accessing a Home Gateway management webpage whereupon the Home Gateway can provide a list of devices it has seen or can currently see in the home network. Each device can have parental control enabled or disabled, for example by selecting a tick box next to each device. Alternatively a parental-control webpage can be provided that then uses a Home Gateway manager to retrieve the home device list and configure the Home Gateway.

IPv6

If the Home Gateway device is IPv6-enabled, it may receive a block of IPv6 addresses from the network provider. These addresses may then be dynamically allocated to user devices that connect to the Home Gateway using DHCP (Dynamic Host Configuration Protocol).

Figure 1:
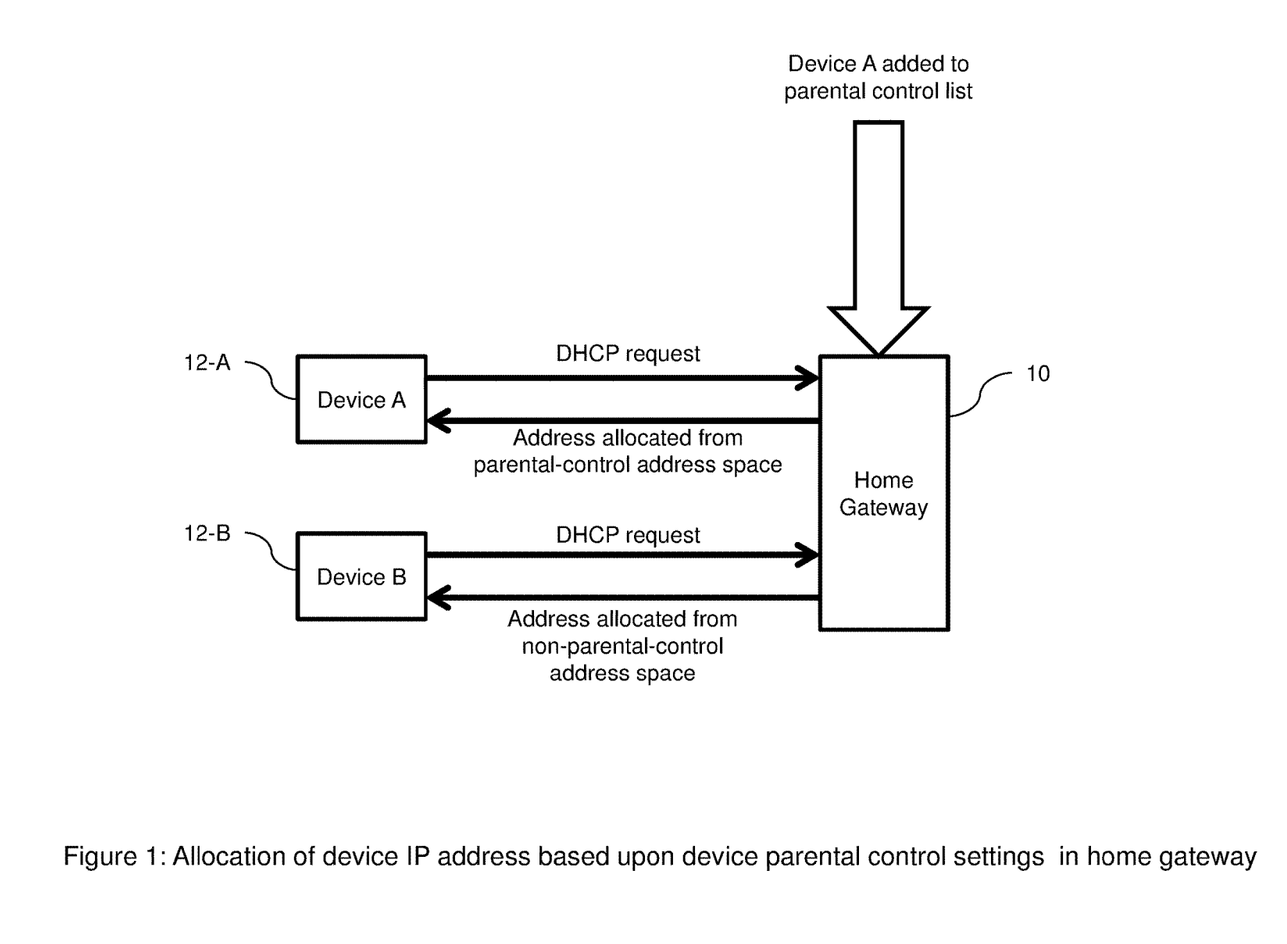
FIG. 1 illustrates a technique for the allocation of IP addresses to individual user devices by a home gateway device based upon individual user device parental control settings.

With the present embodiment, the received block of IPv6 addresses is divided into two parts or sub-sets by the use of a sub-mask. If a particular user device is to be "parental-controlled", the IP address is assigned from the address sub-block or sub-set that matches the "parental-control" sub-mask. It will be appreciated that different levels or styles of parental control can be enabled through the use of more than two address sub-blocks and sub-masks. The use of DHCP to allocate an address to each device from either the parental-control or the non-parental-control address space is illustrated by FIG. 1, which shows a Home Gateway device 10 and two networked user devices, referred to as Device A (12-A) and Device B (12-B), one of which (Device A) is being added to the list of user devices which, according to the policy as configured by the parent or other administrator, is deemed to require parental control, while the other (Device B) is already on the list of user devices deemed not to require parental control. In response to a DHCP request from device A to the home gateway 10, the home gateway allocates an IP address from a (or the) parental-control address space, whereas in response to a DHCP request from device B, the home gateway allocates an IP address from a (or the) non-parental-control address space.

Once the user devices 12-A and 12-B have been allocated IP addresses they can each attempt to communicate with devices in or via external networks such as the Internet and attempt to obtain content from content servers by submitting content requests to them. Part of the process of obtaining content involves the translation of Domain Names in respect of content items such as web-pages to IP addresses where the content in question can be found. As explained earlier, and with reference to FIG. 2, this generally involves a DNS request being submitted via the home gateway 10 to the applicable DNS server, which for the purposes of this embodiment is a parental-control enabled DNS server 16. Depending on the Domain Name in respect of which the DNS request has been made, and on whether content from that Domain has been deemed "appropriate" or "inappropriate", the DNS server may respond with the IP address of the (or a) content server known or believed to be capable of supplying the desired content, or with another IP address (or it may not respond at all) as appropriate. In order to know the correct IP address of the content server for appropriate content, the DNS server 16 may need to contact the authoritative DNS server 17 for the requested domain. Alternatively the DNS server 16 may already hold the IP address in its cache where the same request has previously been made and the result has not expired.

Figure 2:
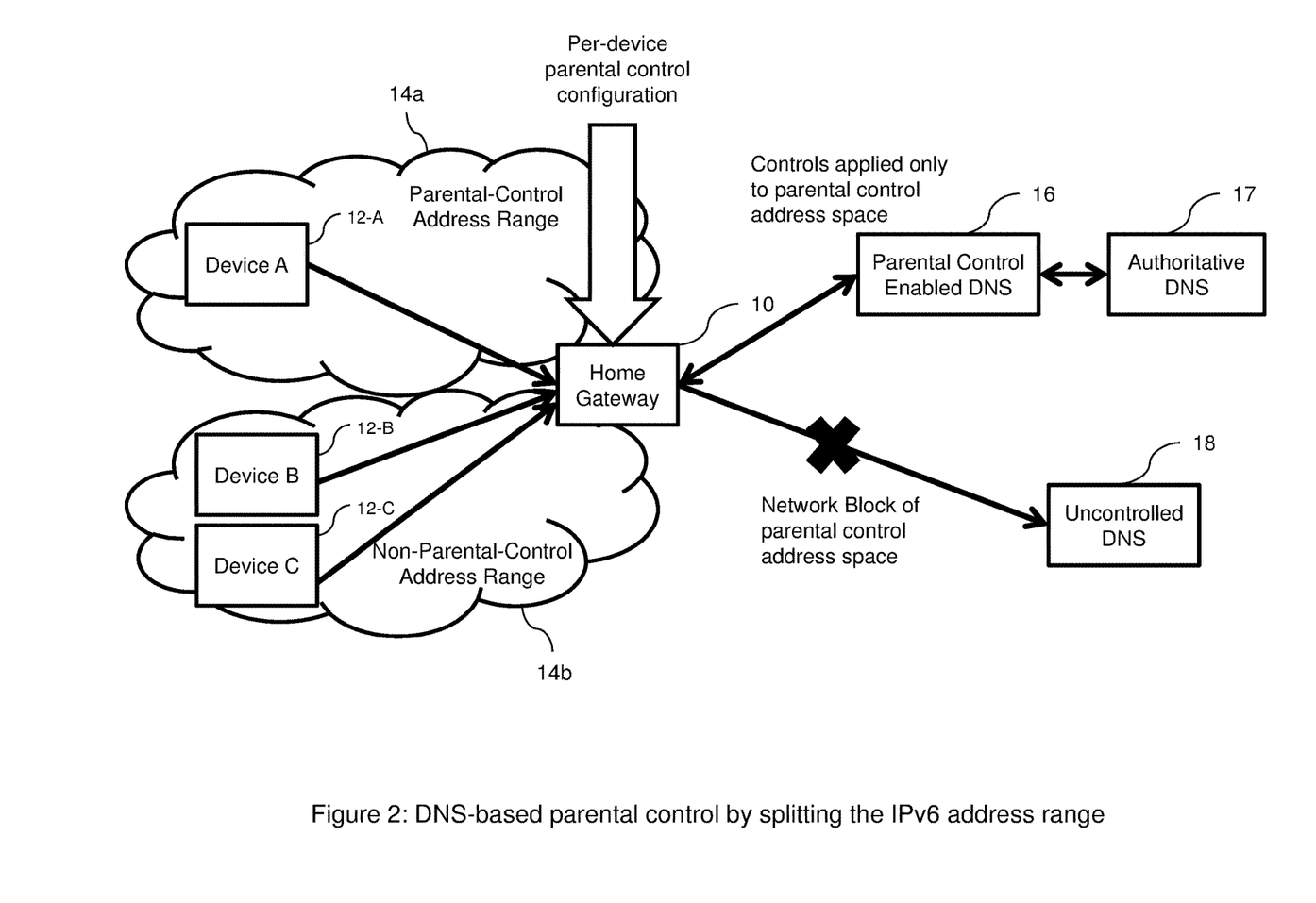
FIG. 2 illustrates the concept of DNS-based parental control at a "per-device" level or at a "per-device-group" level by splitting the IPv6 address range within a user network.

With the present embodiment, if the device 12 attempting to obtain the content has been allocated (and is using) a source IP address from the "parental-control" address space 14a (e.g. Device A, 12-A), this will signal to the parental-control-enabled DNS server 16 that the DNS request is from a device in respect of which the account-holder wishes parental-control to be applied, and the DNS server 16 will respond to the DNS request in the manner deemed appropriate for "parental-controlled" devices. If, on the other hand, the device attempting to obtain the content has been allocated (and is using) a source IP address from the "non-parental-control" address space 14*b* (e.g. Device B, 12-B), this will signal to the parental-control-enabled DNS server 16 that the DNS request is from a device in respect of which the account-holder does not wish parental-control to be applied, and the DNS server 16 will respond to the DNS request in the normal manner, by providing the IP address of the applicable content server (or in the manner deemed appropriate for "non-parental-controlled" devices).

At the parental-control enabled DNS server 16, any Domain Name on the parental-control list will not be translated to the IP address of a server where the content is stored. In this instance, the DNS server 16 will instead return the IP address of an informational page (explaining that the content has been deemed "inappropriate", for example).

If a user device 12 (or possibly just if a device 12-A designated as requiring parental control) attempts to contact an unauthorised DNS server 18 (i.e. attempting to bypass the parental-control enabled DNS server 16), a block may be applied to stop those DNS requests. For example, the home gateway 10, an in-traffic network device (not shown) performing a process such as Deep Packet Inspection (DPI), or a network router (not shown) can be set up to drop or modify DNS packets originating from parental-control-associated addresses or ports. If such blocking is applied at a location which does not see traffic between the user device and the parental-control DNS servers, then the blocking can be applied to all DNS requests from parental-control associated addresses. If the blocking is performed between user devices such as device 12-A and the parental-control DNS server 16, blocking may be set up to exclude the address or address-range of the parental-control DNS server 16 from being blocked.

Figure 6:
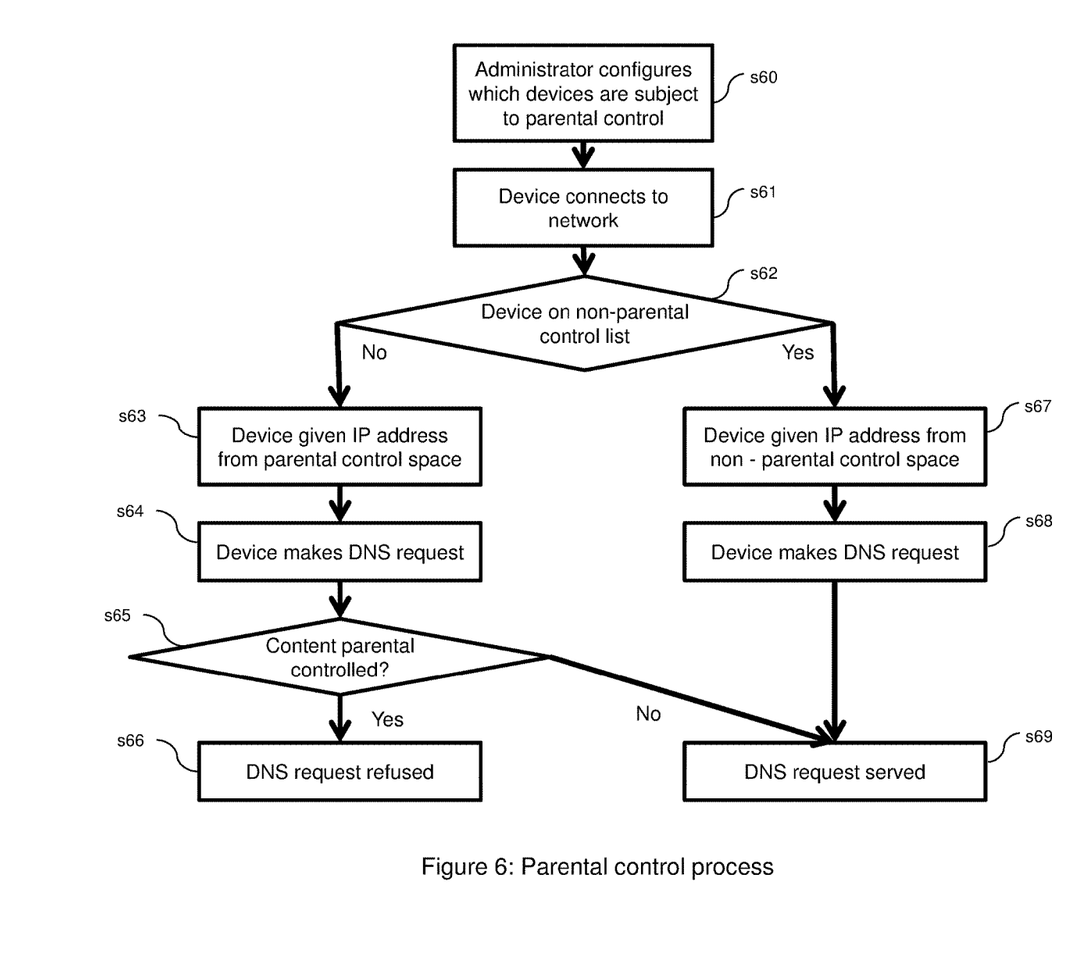
FIG. 6 illustrates a technique for implementing parental control using a method according to a preferred embodiment.

An example of a process by which a parent or other administrator may configure which devices should be parental-controlled to cause DNS requests to be served or denied by a parental-control enabled DNS server 16 (in order to allow user devices to request and obtain content or to hinder or prevent user devices from requesting and obtaining content) is shown in FIG. 6. It will be understood that the process illustrated (or similar processes) may be used in respect of the present IPv6 embodiment or in respect of IPv4 embodiments, modified as applicable (e.g. in relation to embodiments described later in which different port numbers rather than different IP addresses may be used for devices respectively requiring and not requiring parental control).

In step s60, an administrator (such as a parent or account-holder, for example) configures which user devices are to be subject to parental control. As explained with reference to FIG. 1 in particular, this may involve an interaction with a home gateway device 10 in order to configure it, which may be performed by the (or an) administrator, possibly directly, or possibly from one of the user devices 12. There may be a default setting, possibly that all (or no) user devices should be set to be subject to parental control, or all except one, which may be the first user device (e.g. Device C, 12-C) with which the home gateway device 10 makes contact, for example.

In step s61, a user device (e.g. Device A, 12-A or Device B, 12-B) is added to the user network, in order to allow it to communicate with servers and other devices in or via external networks such as the Internet. (NB This step and those that follow need not be performed only when a user device is newly-added—the step and/or subsequent steps may be provided each time a particular user device attempts to communicate with or via a device in an external network, for example.)

In step s62, the administrator decides if the newly-added user device (or a user device currently attempting to communicate with or via a device in an external network by submitting a DNS request, for example) should be subject to parental control or not. If so, the process proceeds via step s63. If not, the process proceeds via step s67.

Figure 4:
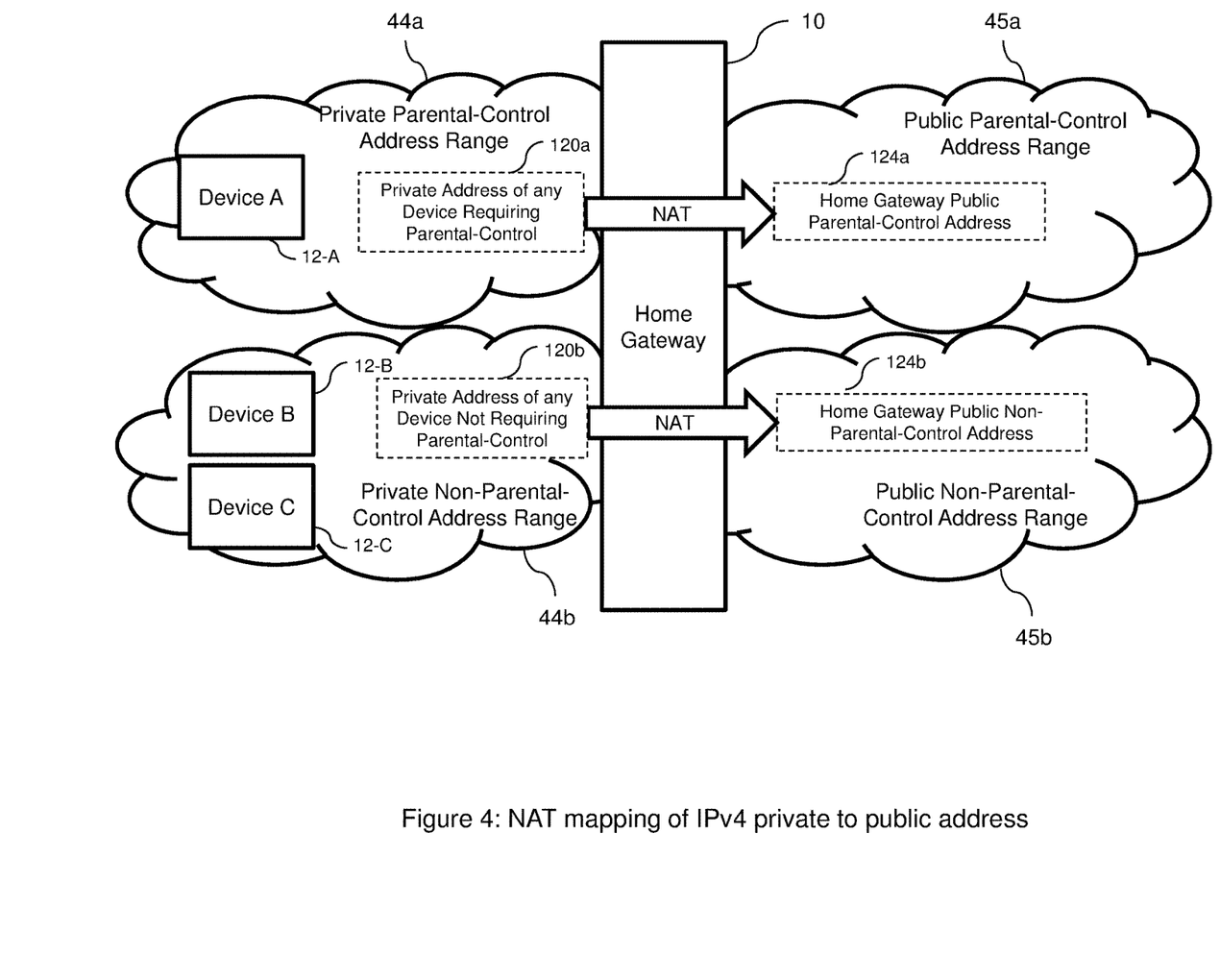
FIG. 4 illustrates the concept of DNS-based parental control at a "per-device" level or at a "per-device-group" level within a user network using a technique involving NAT mapping of IPv4 private to public addresses.
Figure 5:
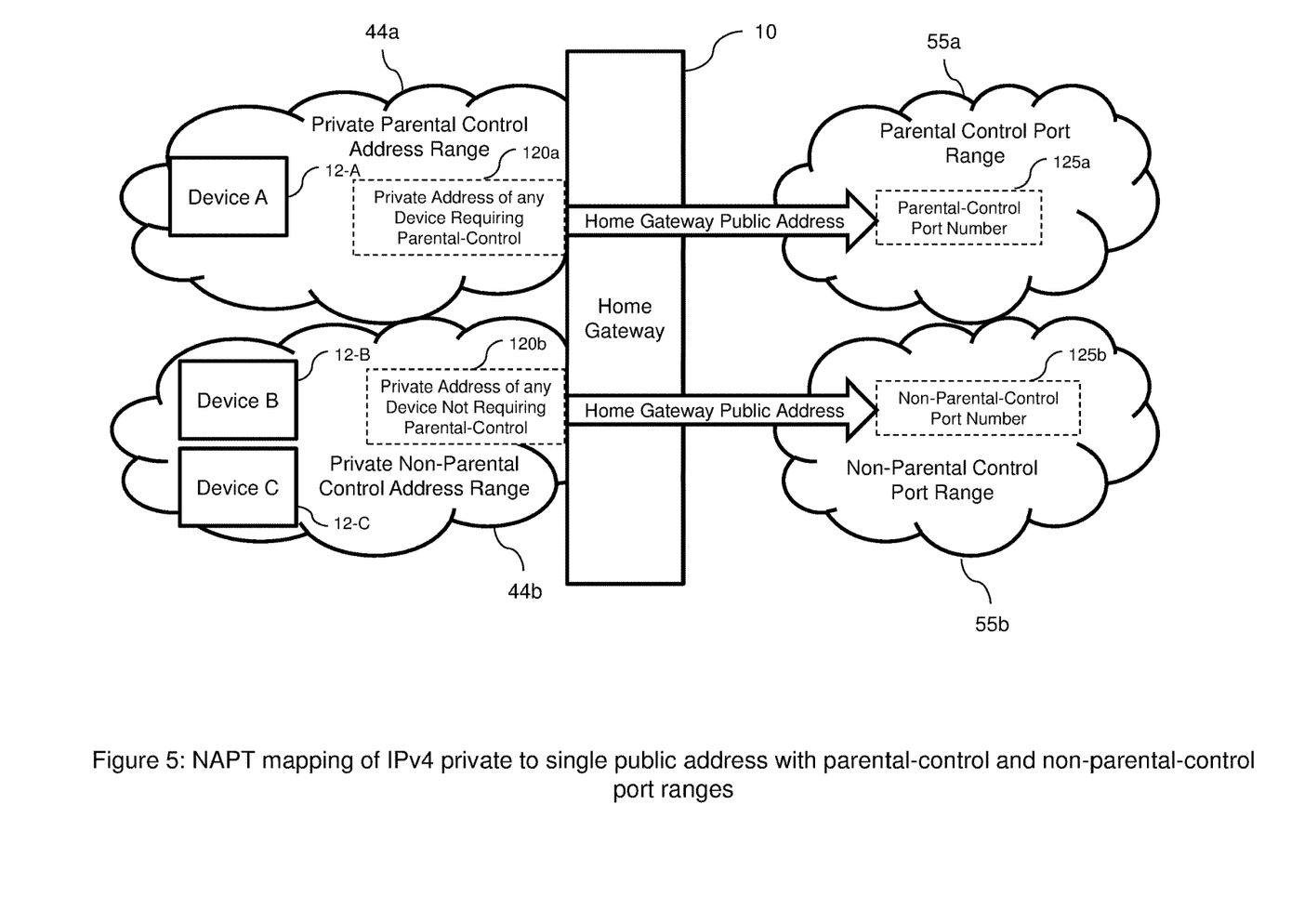
FIG. 5 illustrates the concept of DNS-based parental control at a "per-device" level or at a "per-device-group" level within a user network using a technique involving NAPT mapping of IPv4 private addresses to a single public address with parental-control and non-parental-control port ranges or sets of ports.

In step s63, the user device, having been designated as one for which parental control is applicable (e.g. Device A, 12-A) is allocated an IP address from the "parental-control" address space 14*a* (or 44*a*, in relation to embodiments to be described later with reference to FIGS. 4 and 5). If the device 12-A subsequently makes a DNS request (step s64), this will be forwarded to the parental-control enabled DNS server 16 together with the IP address indicating that the user device is one for which "parental-control" is applicable. The DNS server 16 will process the DNS request accordingly in dependence on whether the content is found at (step s65) to be designated as "appropriate" or "inappropriate" for a user device requiring parental control, "refusing" the DNS request (by not responding, by responding with an "error" or "warning" message, by providing the IP address of a server that will not provide the requested content, or in the appropriate manner) at step s66 if the requested content is inappropriate for a "parental control" device, or by "serving" the DNS request (by responding with the IP address of a server that will provide the requested content, or in the appropriate manner) at step s69 if the requested content is appropriate for a "parental control" device. In the former case, the user device 12-A will have been prevented from (or at least hindered in relation to) making a content request for the desired content, as it will not have been given the IP address for a content server capable of providing the desired (but inappropriate) content by the DNS server 16. In the latter case, the user device 12-A will then be able to make a content request to a content server for the desired content, using the IP address received from the DNS server 16.

Turning now to the right-hand side of FIG. 6, if the user device has been designated as one for which parental control is not required (e.g. Device B, 12-B), it is allocated an IP address from the "non-parental-control" address space 14*b* (or 44*b*, in relation to embodiments to be described later with reference to FIGS. 4 and 5) in step s67. If the device 12-B subsequently makes a DNS request (step s68), this will be forwarded to the parental-control enabled DNS server 16 together with the IP address indicating that the user device is one for which "parental-control" is not required. The DNS server 16 will process the DNS request (at step s69) accordingly, "serving" the DNS request (by responding with the IP address of a server that will provide the requested content, or in the appropriate manner) as previously explained. The user device 12-B will then be able to make a content request to a content server for the desired content, using the IP address received from the DNS server 16.

It will be noted that there may be levels of appropriateness of content other than merely "appropriate" or "inappropriate", and/or a variety of ways of categorising content for different situations and people. Content may, for example, be categorised as being suitable or unsuitable for users of various different age-ranges, in which case it may be appropriate (according to embodiments of the invention) to divide the address-space into more than two sub-spaces, each reflecting the age of the user expected to be using a particular user device, for example. Alternatively, content may be deemed "appropriate" or "inappropriate" to different users in dependence on possible religious and/or moral beliefs, or otherwise, which may require processing of DNS requests by the DNS server in accordance with an "appropriateness" policy setting out whether certain types of content are desired to be allowed or not. In any of these cases, as long as DNS requests are provided to the DNS server 16 together with an IP address or other such device source identifier indicating particular user device and/or the level(s) or category/categories of control required for the particular user device in the user network, and provided the DNS server 16 is configured to be responsive to such DNS requests in the appropriate manner, control according to any number of levels or styles may be implemented.

The configuring of a DNS server in order to be able to react appropriately to DNS requests in accordance with different policies will not be discussed in detail here as such configuring of DNS servers may be done using techniques such as those that may be done in order to configure DNS servers to allow parental-control to be offered as discussed in the "Open DNS" and "How-To Geek" articles on "Parental Controls" referenced earlier.

Figure 3:
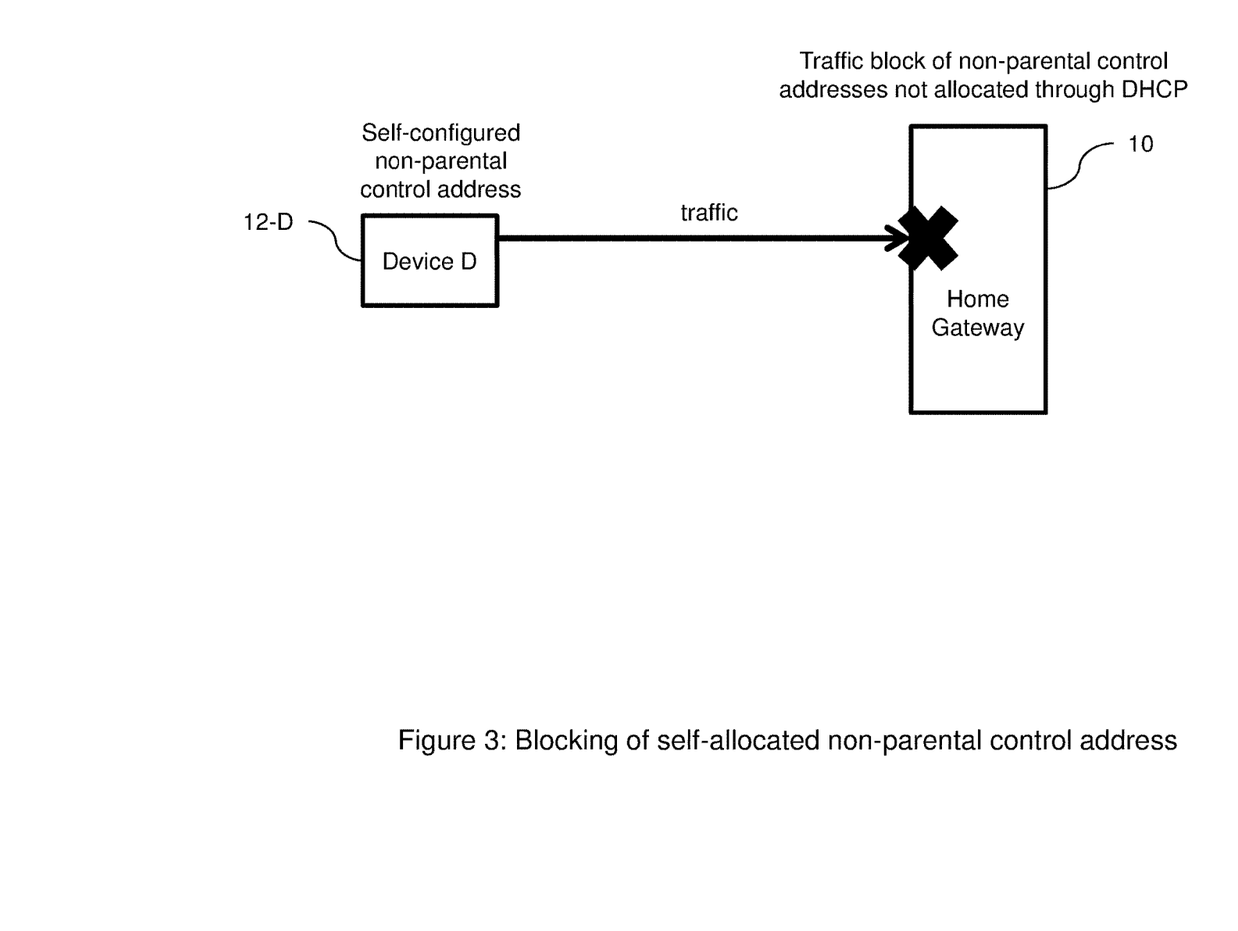
FIG. 3 illustrates the blocking of traffic from user devices having self-allocated non-parental-control addresses.

Since a user device 12-A, 12-B, etc. may be capable of specifying its own IP address instead of obtaining one via a DHCP request to the home gateway 10, to avoid one type of circumvention of the above parental-control technique, the home gateway 10 should preferably not route traffic (or possibly just not route DNS requests) for any user device that is not communicating using an IP address that has been assigned by the home gateway. Another option is for devices to be allowed to specify or configure their own IP addresses, but only from the sub-block or sub-set 14*a* used for parental control—i.e. any device that assigns its own IP address is forced to make itself subject to parental control. FIG. 3 illustrates the idea that traffic (or possibly just DNS requests) from a user device such as Device D (12-D) which has self-assigned itself an IP address may be blocked, in order to avoid it taking advantage of a non-parental-control address space.

A further option is for the home gateway 10 to apply NAT (Network Address Translation) to any device configuring its own IP address. This may be used to translate the device-chosen IP address into an address from the parental-control IP address block or set 14*a*. This latter technique may ensure that any chosen address will be routable over the external network but it may cause problems for some applications and may degrade performance in some ways.

DHCP may also be used to configure the DNS service that will be used by a user device. The home gateway may direct a user device to use either a parental-control or a non-parental-control DNS server as appropriate. In an alternative implementation (which may be simpler for the home gateway), all DNS servers (or all those to which DNS requests from user devices may be sent) may be parental-control enabled and any DNS server that receives a DNS request will use the IP address of the user device to decide whether to restrict access to the content.

The optional blocking of uncontrolled DNS servers and tunnelling services such as VPNs can either be implemented in the Home Gateway or in the network. In the former case the Home Gateway essentially "knows" which user devices have parental-control enabled. Therefore the Home Gateway can block DNS requests to DNS servers other than the ones given to the device by the Home Gateway. For devices using a parental-control IP address this block can be implemented simply by stopping any source IP address matching the parental-control sub-mask from accessing any DNS server other than the DNS server specified by the Home Gateway (or alternatively all parental-control DNS servers). Alternatively the Home Gateway can perform the block at a lower layer by preventing such DNS requests from user devices that are parental-controlled (by matching the MAC address).

If the uncontrolled DNS block is implemented in the external network instead of the Home Gateway, then the IP address sub-mask method should preferably be used since equipment in the external network generally will not know which devices should be parental-controlled. Implementation within the user network generally allows the Home Gateway to remain simpler and cheaper.

IPv4

If the Home Gateway device is IPv4-enabled, the user devices 12-A, 12-B, 12-C, etc. may be given IP addresses from a private address space, which may be mapped to one or more public addresses by using NAT within the Home Gateway. To implement a system that mimics the IPv6 implementation described above, both the private and public addresses can be divided into a "parental-control" block (i.e. resulting in private parental-control address range 44*a* and public parental-control address range 45*a*) or set of addresses and a "non-parental-control" block (i.e. resulting in private non-parental-control address range 44*b* and public non-parental-control address range 45*b*) or set of addresses as shown in FIG. 4. Any private address 120*a* from the parental-control range or set 44*a* is mapped to a parental-control public IP address 124*a*. Similarly, any private address 120*b* from the non-parental-control range or set 44*b* is mapped to a non-parental-control public IP address 124*b*. In most implementations the Home Gateway 10 will only need and may only have two public addresses—one for parental-control and one for non-parental-control.

While the division of both private and public address space described above essentially provides an exact replica of the IPv6 implementation, the use of NAT provides some other options. An alternative to dividing the private IP address space is to use a single private address space and dynamically determine which public address to use, based upon whether a particular device requires parental controls or not. This option may require a look-up of the parental-control settings for each device whenever traffic is received, which may reduce the performance of the NAT and possibly prohibit implementation of the NAT on fast hardware.

Using Port Numbers as an Alternative to IP Addresses for IPv4

So far we have discussed the division of the IP address space into parental-controlled and non-parental-controlled sub-spaces. The use of NAT, or more accurately NAPT (Network Address and Port Translation) for IPv4 provides an alternative. While the private IP address space may still be divided into a controlled and non-controlled address sub-space, only a single public IPv4 address needs to be used, which may be the public address of the home gateway 10 itself. This provides a significant additional advantage since the number of available IPv4 addresses is being exhausted. Since the NAPT works by translating both the address and the port being used for the device, the public port numbers can be divided into a parental-controlled port-number range or set 55*a* (including at least one parental-control port-number 125*a*) and a non-parental-controlled port-number range or set 55*b* (including at least one non-parental-control port-number 125*b*). This implementation is illustrated in FIG. 5.

The DNS or network equipment (controlling access to uncontrolled DNS servers) can apply controls on any traffic from within the selected parental-control port range or set (as well as to any IPv6 address from within the parental-control IPv6 address range or set).

The invention claimed is:

1. A method of processing digital content service requests from one or more user devices in a user network, the user network having a user-network administrator and comprising one or more user devices and at least one control device configured to control communication between the one or more user devices in the user network and one or more servers in one or more external networks outside the user network, each digital content service request relating to digital content desired by a user of a user device, the method comprising:

the at least one control device receiving, via an administrator interface configured to receive policy indications from the administrator of the user network, a policy indication in respect of each of one or more user devices in the user network, the respective policy indications indicating a desired control policy desired by the administrator of the user network to be implemented in respect of digital content service requests from the respective user devices in the user network;

the at least one control device assigning respective user device source identifiers to respective user devices in the user network in respect of which policy indications have been received, each user device source identifier indicating to a server in an external network outside the user network a network location of a device in the user network to which a response to a request should be directed, the user device source identifier assigned to a particular user device being assigned in dependence on the policy indication received in respect of that user device; and the at least one control device receiving a digital content service request from a user device in the user network, the digital content service request containing an indication of a domain name associated with a content provider from which digital content is desired by the user of the user device, and submitting a server location request in respect thereof to a domain name system server configured to respond to respective server location requests in a manner dependent on a user device source identifier included with the server location request, the server location request comprising:

an indication of the domain name indicated in the digital content service request; and the user device source identifier assigned to the user device from which the digital content service request has been received.

2. A method according to claim 1 wherein the at least one control device assigns a different user device source identifier to each of a plurality of the user devices.

3. A method according to claim 1 wherein the at least one control device assigns the same user device source identifier to a plurality of user devices in respect of which policy indications have been received indicating the same desired control policy.

4. A method according to claim 1 wherein the respective user device source identifiers assigned to user devices are different routing identifiers.

5. A method according to claim 1 wherein the respective user device source identifiers assigned to user devices are different port numbers.

6. A method according to claim 1 wherein the at least one control device provides user device source identifiers to respective user devices for inclusion by said user devices in digital content service requests.

7. A method according to claim 1 wherein when submitting a server location request in respect of a digital content service request received from a particular user device, the at least one control device includes the user device source identifier assigned to that user device with the server location request.

8. A method according to claim 1 wherein the control policy to be implemented in respect of digital content service requests from a particular user device relates to whether or not it is desired by an administrator of the user network for respective server location requests from that user device to be served or not served in dependence on the domain name indicated in a digital content service request in respect of which a server location request has been submitted or in dependence on the digital content in respect of which a server location request has been submitted.

9. A method according to claim 1 wherein the control policy to be implemented in respect of digital content service requests from a particular user device relates to one or more categories of domain name or categories of digital content in respect of which it is desired by an administrator of the user network for respective server location requests from that user device to be served or not served by a domain name system server in dependence on the user device source identifier included in the server location request submitted to the domain name system server.

10. A method according to claim 1 wherein the step of submitting a server location request comprises submitting a server location request to a domain name system server in an external network.

11. A method according to claim 1 the method further comprising the control device receiving a response from a domain name system server to a server location request submitted thereto, the response comprising a routing identifier in respect of a content device in an external network, the control device then forwarding the content device routing identifier to the user device from which the digital content service request was received.

12. A method according to claim 1 wherein the control policy to be implemented in respect of digital content service requests from a particular user device relates to whether or not it is desired by an administrator of the user network for respective server location requests from that user device to be served or not served in dependence on the domain name indicated in a digital content service request in respect of which a server location request has been submitted and in dependence on the digital content in respect of which a server location request has been submitted.

13. A method according to claim 1 wherein the control policy to be implemented in respect of digital content service requests from a particular user device relates to one or more categories of domain name and categories of digital content in respect of which it is desired by an administrator of the user network for respective server location requests from that user device to be served or not served by a domain name system server in dependence on the user device source identifier included in the server location request submitted to the domain name system server.

14. A control device for processing digital content service requests from one or more user devices in a user network, the user network having a user-network administrator and comprising the control device and one or more user devices, the control device being configured to control communication between the one or more user devices in the user network and one or more servers in one or more external networks outside the user network, each digital content service request relating to digital content desired by a user of a user device, the control device comprising a computer hardware processor, the control device being at least configured to:

receive policy indications in respect of each of one or more user devices in the user network, the respective policy indications indicating a desired control policy desired by the administrator of the user network to be implemented in respect of digital content service requests from the respective user devices in the user network;

assign respective user device source identifiers with respective user devices in the user network in respect of which policy indications have been received, each user device source identifier indicating to a server in an external network outside the user network a network location of a device in the user network to which a response to a request should be directed, the user device source identifier assigned to a particular user device being assigned in dependence on the policy indication received in respect of that user device;

receive digital content service requests from user devices in the user network, a digital content service request containing an indication of a domain name associated with a content provider from which digital content is desired by a user of a user device; and submit server location requests in respect of received digital content service requests to a domain name system server in an external network, the domain name system server being configured to respond to respective server location requests in a manner dependent on a user device source identifier included with the server location request, each server location request comprising:

an indication of the domain name indicated in the received digital content service request; and the user device source identifier assigned to the user device from which the digital content service request has been received.

15. A system for processing digital content service requests from one or more user devices in a user network, the user network comprising a control device according to claim 14, one or more user devices, and a domain name system server configured to respond to respective server location requests in a manner dependent on the user device source identifier included with the server location requests.

* * * * *